United States Patent
Claassen et al.

(10) Patent No.: US 8,197,124 B2
(45) Date of Patent: Jun. 12, 2012

(54) HEAT FLOW MEASUREMENT TOOL FOR A RACK MOUNTED ASSEMBLY OF ELECTRONIC EQUIPMENT

(75) Inventors: Alan Claassen, Fremont, CA (US); Dennis John Hansen, Rochester, MN (US); Cary Michael Huettner, Rochester, MN (US); Madhusudan K Iyengar, Woodstock, NY (US); Roger R Schmidt, Poughkeepsie, NY (US); Kenneth Robert Schneebeli, San Jose, CA (US); Gerard Vincent Weber, Jr., Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 12/365,990

(22) Filed: Feb. 5, 2009

(65) Prior Publication Data
US 2010/0195694 A1  Aug. 5, 2010

(51) Int. Cl.
G01K 17/08 (2006.01)
G01K 13/02 (2006.01)
(52) U.S. Cl. ............ 374/29; 374/43; 374/143; 361/724; 361/690; 454/184; 312/223.2
(58) Field of Classification Search .............. 374/29, 374/43, 143; 361/724, 690; 454/184; 312/223.2
See application file for complete search history.

(56) References Cited

U.S. PATENT DOCUMENTS

| | | | |
|---|---|---|---|
| 4,608,819 A | 9/1986 | Colman et al. | |
| 4,935,845 A * | 6/1990 | Schwehr et al. | 361/694 |
| 5,056,331 A * | 10/1991 | Lotz | 62/237 |
| 5,281,026 A | 1/1994 | Bartilson et al. | |
| 5,410,448 A | 4/1995 | Barker, III et al. | |
| 5,760,333 A | 6/1998 | Kitahara et al. | |
| 5,907,473 A | 5/1999 | Przilas et al. | |
| 5,947,189 A | 9/1999 | Takeuchi et al. | |
| 5,982,618 A * | 11/1999 | Roos | 361/695 |
| 6,962,435 B2 * | 11/2005 | Stenestam | 374/152 |
| 7,214,131 B2 | 5/2007 | Malone | |
| 7,226,206 B2 * | 6/2007 | Romes | 374/29 |
| 7,233,493 B2 | 6/2007 | Wang et al. | |
| 7,315,448 B1 | 1/2008 | Bash et al. | |
| 7,347,058 B2 | 3/2008 | Malone et al. | |
| 7,403,391 B2 * | 7/2008 | Germagian et al. | 361/695 |
| 7,438,124 B2 * | 10/2008 | Bhatti et al. | 165/248 |
| 7,651,260 B2 * | 1/2010 | Hamann et al. | 374/5 |
| 7,788,940 B2 * | 9/2010 | Madara et al. | 62/259.2 |
| 7,854,547 B2 * | 12/2010 | Claassen et al. | 374/43 |
| 7,990,710 B2 * | 8/2011 | Hellriegel et al. | 361/699 |
| 8,009,430 B2 * | 8/2011 | Claassen et al. | 361/724 |
| 2002/0027942 A1 | 3/2002 | Nishijima et al. | |
| 2005/0094706 A1 | 5/2005 | Guha et al. | |
| 2007/0097636 A1 | 5/2007 | Johnson et al. | |
| 2008/0040067 A1 | 2/2008 | Bashor et al. | |
| 2008/0055850 A1 | 3/2008 | Carlson et al. | |

(Continued)

Primary Examiner — Christopher Fulton
(74) Attorney, Agent, or Firm — Robert Lahtinen

(57) ABSTRACT

A rack mount assembly measurement tool, for determining physical values including air flow and heat loads, includes a front assembly and a rear duct assembly that are non-intrusively and releasably mounted on the front and rear of such rack mount enclosure. Physical values are sensed at multiple vertical locations to enable a determination of overall and localized heat loads within the enclosure. Front sensor values are collected and wirelessly transmitted from the front assembly to a receiver/processor supported on the rear duct, which generates computed values that are displayed in addition to the sensed values.

18 Claims, 5 Drawing Sheets

U.S. PATENT DOCUMENTS

| | | |
|---|---|---|
| 2009/0030554 A1 * | 1/2009 | Bean et al. ............... 700/276 |
| 2010/0027581 A1 | 2/2010 | Sasaoka |
| 2010/0046574 A1 | 2/2010 | Hamann et al. |
| 2010/0051243 A1 | 3/2010 | Ali et al. |
| 2010/0065355 A1 | 3/2010 | Reddy |

* cited by examiner

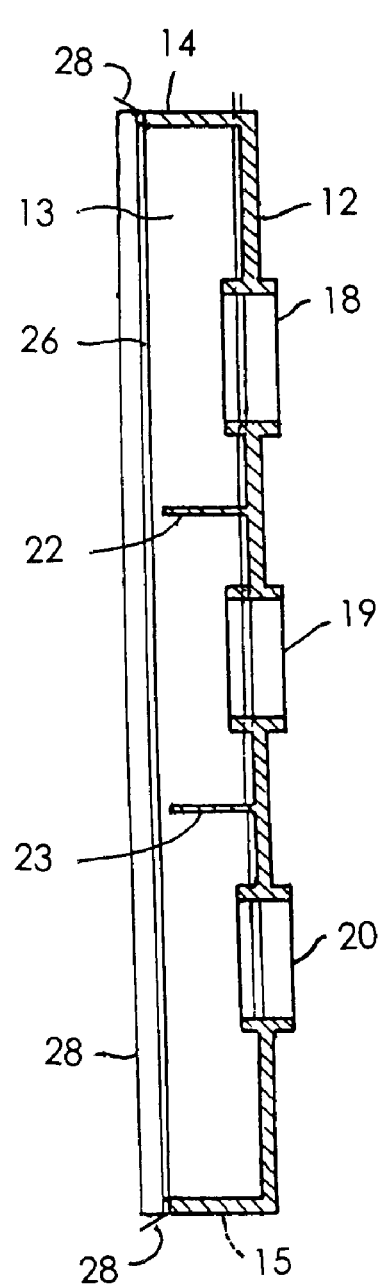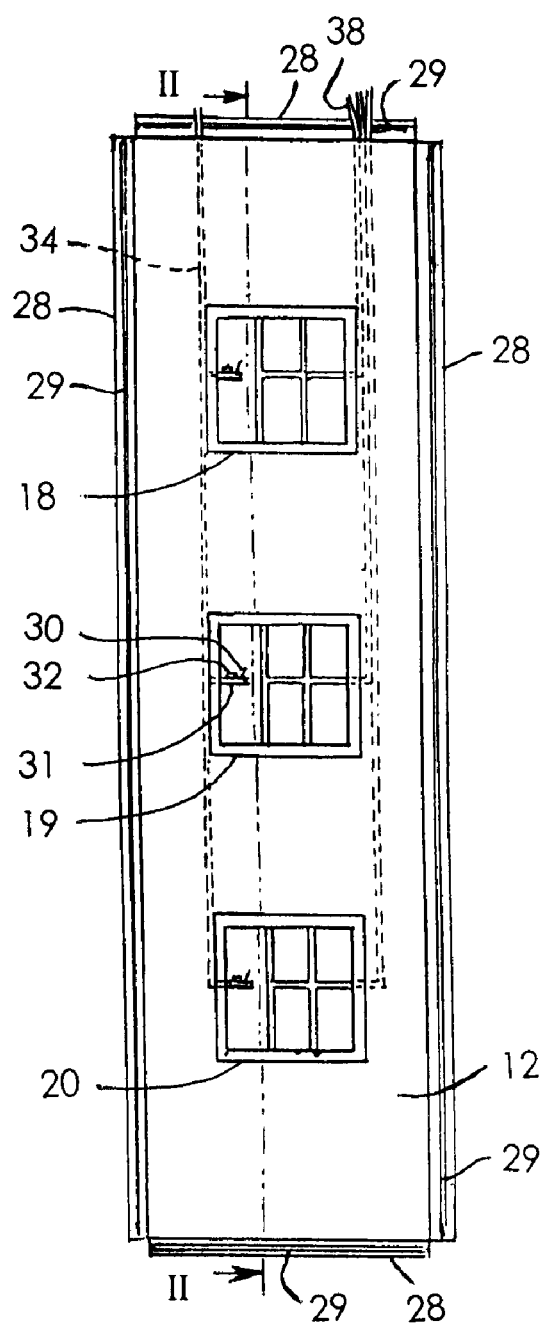
FIG. 2
FIG. 1

HEAT FLOW MEASUREMENT TOOL FOR A RACK MOUNTED ASSEMBLY OF ELECTRONIC EQUIPMENT

FIELD OF THE INVENTION

The invention pertains to heat flow measurement equipment and more particularly to a method and apparatus for non-invasively measuring the heat flow associated with a rack mounted assembly of electronic equipment.

BACKGROUND AND SUMMARY

The present invention is related to application Ser. No. 11/834,752, filed Aug. 7, 2007, now U.S. Pat. No. 7,854,547 and entitled "Bidirectional and Expandable Heat Flow Measurement Tool for Units of Air Cooled Electrical Equipment" which is directed to ascertaining conditions related to individual electronic components, such as servers. The measurement tool illustrated and described is mounted sequentially at the front and then at the back of the device under test to obtain air pressure and temperature values, which in turn enable the air flow and rate of heat dissipation to be determined. This measurement tool also presents a marginal surface, which engages the device, that is compliant to allow any cables to remain connected to the device and continue device operation during test.

At the rack level it is also necessary to obtain data regarding physical conditions to assist installation and determine whether subsequent operating conditions comply with the design requirements. The problems encountered by the assembly of numerous devices at the rack level differs from those for an individual device and requires different solutions.

As individual electronic components are improved, the power consumption is usually reduced; however, since the concentration of components is rapidly increased, the concentration of power and the requirement to dissipate heat from a given space is increased. The number of components concentrated in a given space rises faster than the power requirements diminish. Adequate heat sink capability and air flow capacity must be increased commensurate with the increase in power. To assure adequate heat dissipation, water cooling is also employed to assist heat dissipation. The use of water cooling also introduces a further level of concern when employed with electronic equipment.

To comply with data center owner's preferences or outright requirements, it is necessary that any equipment or system test be effected non-invasively and be non-disruptive with respect to operating equipment. No customer or user is likely to allow equipment to be turned off to obtain information such as an inline power measurement. In the rack mount environment, it is also necessary that the heat dissipation capability be determined with rack covers in place so that this second order effect is included in the determination of the effectiveness of the overall system. Similarly, the equipment utilized for testing must be designed and used in a manner that imposes minimal additional effect on the system subject to investigation.

In a rack mount enclosure it has been found that a vertical temperature gradient through the height of the rack enclosure air input opening must be accommodated to obtain an accurate determination of localized heat dissipation in addition to overall air flow and heat dissipation values. The temperature must be observed at multiple vertically spaced locations calculated to accurately represent the variation of temperature over the height of the enclosure opening. It is also preferable practice to obtain sensed values, such as temperature simultaneously at both the inlet and outlet locations of the system.

At the outlet of the cabinet, the air flow may be collected and routed through a single duct for sensing air pressure and temperature (to obtain respectively a calculated air flow and temperature difference). Such an approach materially adds to the air pressure drop of the system and results in undesirable vector effects at the exit caused by a large volume of air being turned 90 degrees approaching the single outlet. Air resistance can be reduced to obtain a more accurate and representative value of air flow and mean air temperature, while accommodating the vertical temperature gradient, by employing multiple exit ducts vertically spaced through the height of the rack enclosure outlet opening. The outlet air flow is further stabilized by the use of horizontal flow partitioners between adjoining exit ducts. The measurement of the quantity of heat removed from the enclosure can be made with greater accuracy by also determining the relative humidity at the locations at which temperature is determined to obtain the specific heat in the air volume passing through the enclosure.

When used with a rack enclosure assembly that includes water cooling, the relative humidity sensed at the locations at which the temperature is determined can also provide a determination of the absolute humidity entering and leaving the enclosure. A rise of absolute humidity between the rack enclosure inlet and outlet air openings can be used to initiate a signal calling for a check of the integrity the water cooling system.

In the environment wherein enclosures are used to house units of identical blower or fan cooled devices, the use of known device fan or blower rotational speeds (RPM) can be utilized in the calculation of rack enclosure air flow and heat dissipation values.

BRIEF DESCRIPTION OF THE DRAWINGS

FIG. 1 is an elevation of the rear duct with the conduit and tube portions leading from the sensors shown in phantom view.

FIG. 2 is a section view taken along line II-II of FIG. 1.

DETAILED DESCRIPTION

Figure 5:
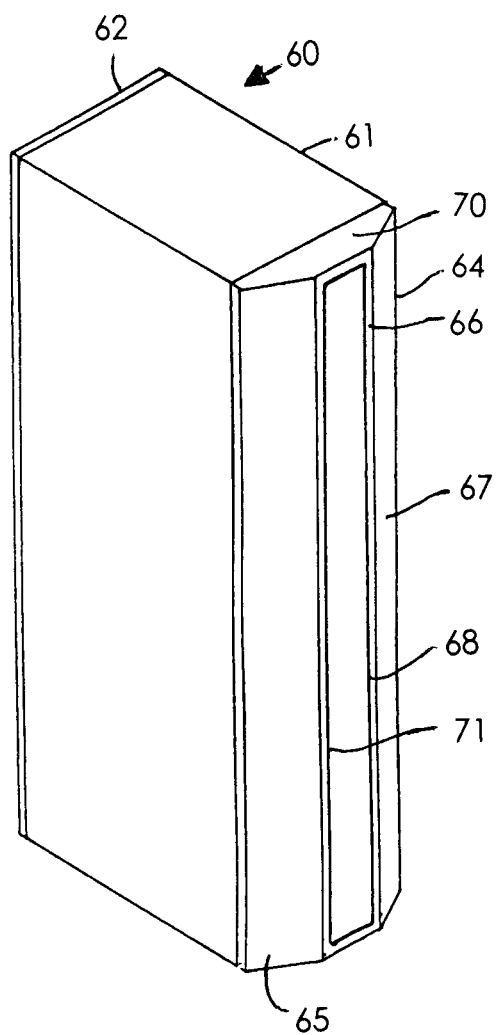
FIG. 5 is an isometric view of a typical rack mount enclosure assembly.

FIG. 1 illustrates the rear duct assembly 10 of the present invention and FIG. 2 is a section view of the rear duct assembly of FIG. 1 taken along line II-II. The duct assembly 10 includes an end wall 12 with contiguous side walls 13, top wall 14 and bottom wall 15. The end wall 12 includes integral upper, middle and lower duct portions 18, 19 and 20 respectively. Also formed integral with the end wall 12 and side walls 13 are a pair of flow partitioners 22 and 23 which are horizontal panels that divide the air passing through the assembly 10 into upper, middle and lower flow paths. The duct assembly, as illustrated, is formed of a closed cell plastic material, but could be constructed of any material that would confine and direct the air flow while possessing a low specific heat to enable the temperature of air passing through the assembly to quickly stabilize to the temperatures at the entry and exit of the system. For example, the assembly could be a flexible material formed over a tubular frame which could be hinged to enable greater flexibility to accommodate variations in rack dimensions.

As shown, the duct assembly 10 includes a continuous, readily compressible foam strip 26 along the distal edges of side walls 13, top wall 14 and bottom wall 15 that serves as a gasket to seal the assembly against the marginal wall surfaces which surround a rack enclosure rear opening when the duct assembly 10 is secured thereto. Flexible marginal flaps 28 are secured at the edges of the top wall, bottom wall and side walls of the duct assembly 10. Each of the flaps 28 includes a continuous flexible magnet 29 which adheres the respective flap to a rack wall surface when the duct assembly 10 is installed in the operating position, to thereby attach and secure the rear duct assembly.

Temperature is sensed within each of the upper, middle, and lower duct portions 18, 19 and 20 by a thermocouple 30 supported on the respective tube branch 31. Also mounted on each of the tube branches 31 is a relative humidity sensor 32. The wire leads for each of the thermocouples and relative humidity sensors enters the respective tube branch 31 through an opening or openings therein and extends up the integral vertical tube 34 (which is shown in phantom view, save for the uppermost portion which emerges through the top wall).

Figure 3:
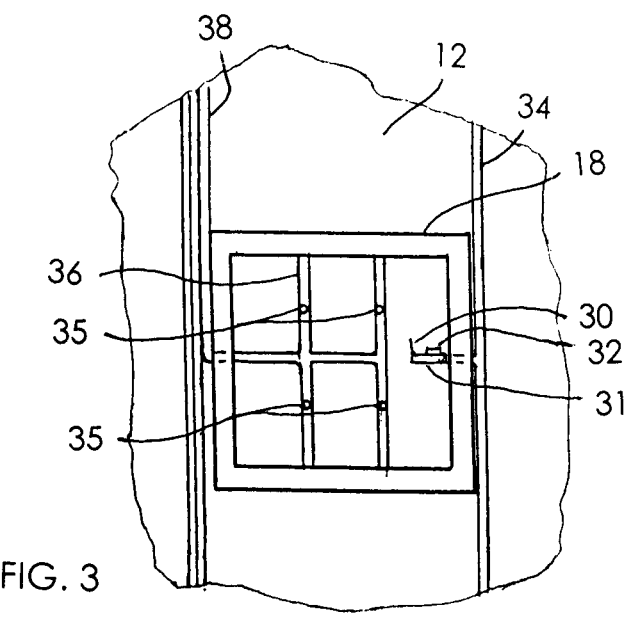
FIG. 3 is a partial rear elevation of the rear duct showing the detail of one of the three pitot assemblies.

The air pressure sensing structure is more clearly shown in FIG. 3, which is a partial elevation which shows the side of the upper duct portion 18 opposite the side shown in the elevation of FIG. 1. Air pressure is sensed using pitot openings 35 in an "H" shaped tube assembly 36 where the end of each leg is closed and supported in the upper or lower wall forming the respective duct portion 18. The pitot tube assembly 36 includes a single outlet in the form of a tube which extends horizontally through the duct portion 18 side wall and upward through top wall 14 such that an independent tube 38 extends from each of the "H" shaped pitot assemblies resident in an associated duct portion 18, 19 or 20. Also visible in FIG. 3 is the branched tube 34 which serves as a conduit for the leads from thermocouples 30 and relative humidity sensors 32 mounted on integral branch tubes 31.

Figure 4:
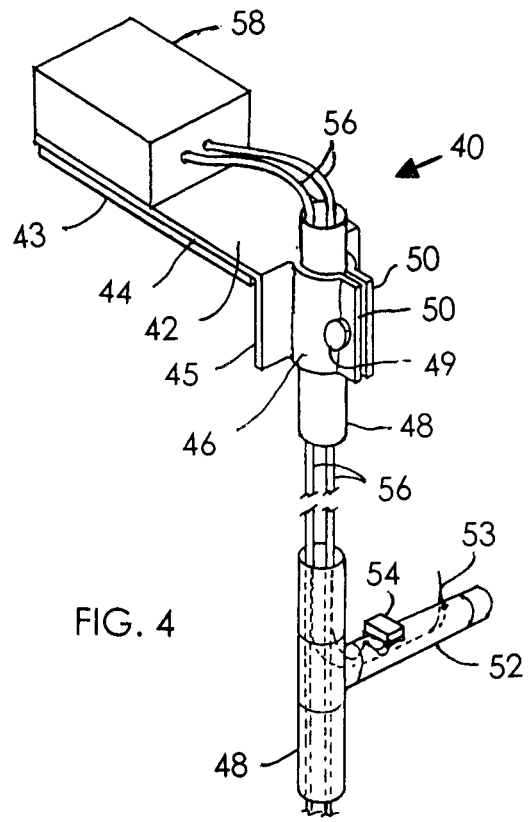
FIG. 4 is an interrupted, partial isometric view, partially in phantom view, of the measurement tool front assembly.

FIG. 4 is a partial isometric view (which is interrupted and partly in phantom view) of a front, entry air temperature and relative humidity sensing assembly 40 for a rack mount enclosure. An angle frame element 42 has a magnet 43 secured to the lower surface of the horizontal portion 44 which enables the assembly to be firmly, but releasably secured to a steel rack enclosure door. The vertical flange 45 includes a clamp 46 for securing the conduit tube 48 and precluding rotation of the tube relative to the assembly frame 42. The clamp 46 is secured to the tube 48 by turning thumb screw 49 and urging the flanges 50 toward one another.

The vertical conduit tube has three parallel branches 52, each of which supports a thermocouple 53 for temperature sensing and a relative humidity sensor 54. Leads from the sensors 53 and 54 enter the conduit through openings in the branch tube on which it is supported and, as a part of a cable 56 in the vertical conduit tube 48, extend from the upper end of the conduit. The cables 56 are attached to the wireless transmitter 58 which is secured to and supported on the upper surface of the horizontal portion 44 of angle frame 42. The conduit branches 52 are separated by a distance substantially the same as the vertical spacing between the adjacent temperature sensors 30 supported on the rear duct assembly 10 of FIG. 1. This spacing enables the temperature and relative humidity sensed at sites located at the front and rear of the rack mount enclosure to be respectively at the same height.

FIG. 5 illustrates a typical rack enclosure 60 which includes a body portion 61 with open front and rear surfaces. At the rear a planar rear door 62 is often mounted which includes a perforated steel or louvered steel surface to present a minimal obstruction to air flow. One option is to not mount a rear door and thereby minimize or virtually eliminate air flow restriction. The front door 64 may be a planar member, similar to that shown as the rear door of FIG. 5, which has extensive louvered or perforate surface areas or may be of a convex configuration as shown in FIG. 1 wherein one or more of the front surfaces 65, 66 and 67 include substantial perforate surfaces to afford minimal air flow resistance. The convex structure also offers the opportunity to utilize extensive open areas with an internal baffle structure to create large inlet air passages and minimize air flow resistance while precluding line of sight access through the door. As illustrated in FIG. 5, the front door is convex with a front surface 66 that is entirely removed except for marginal flange surfaces 68. A vertical column is mounted within the door which divides the air flow, interrupts the line of sight into the enclosure, and provides the opportunity to present a rigid flow directing surface on the center column outwardly facing surface and a sound attenuating surface facing the rack mount enclosure.

When operating to determine physical characteristics such as heat flow, the apparatus including the duct assembly of FIG. 1 and the entry air sensing assembly of FIG. 4 are mounted respectively at the rear wall outlet and the front door air entry of the rack mount assembly such as that of FIG. 5. The entry air sensing assembly of FIG. 4 is magnetically attached by securing the magnet 43 to the door upper surface 70 (FIG. 5). To minimize the intrusion into the inlet air flow path, the inlet air assembly 40 is attached to the rack mount enclosure door 64 with the vertically extending conduit 48 adjacent the door flange 71 and the conduit branches 52 extending across the opening in door surface 66. Thus, only the conduit branches and the sensor elements which they support are disposed in the air flow path.

The duct assembly 10 of FIG. 1 is mounted at the rear surface of the rack mount assembly 60 with the flexible gasket material abutting the rack rear door or the rack mount cabinet marginal wall portions or flanges if a rear door is not present. The duct assembly 10 is secured to the rack mount cabinet 60 by the continuous magnets 29 in the flexible flaps 28 that overlie the steel cabinet surface portions. The temperature and relative humidity sensor leads are wired directly to the processor and display unit 72 mounted on the duct assembly top wall 14. Likewise, the tubes connected to the pitot openings 35 within the duct portions are connected to the processor 72 to enable the average pressure encountered in each duct portion to be simultaneously sensed. The wireless connection between the processor 72 and the wireless transmitter 58 enables the simultaneous determination of inlet and outlet temperatures and relative humidities and the pressure differential to optimize the accuracy of the heat flow determination.

Figure 7:
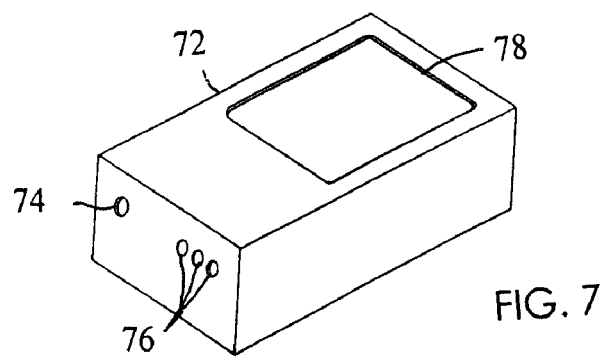
FIG. 7 shows details of the wireless receiver/processor carried by the rear duct assembly.
Figure 6:
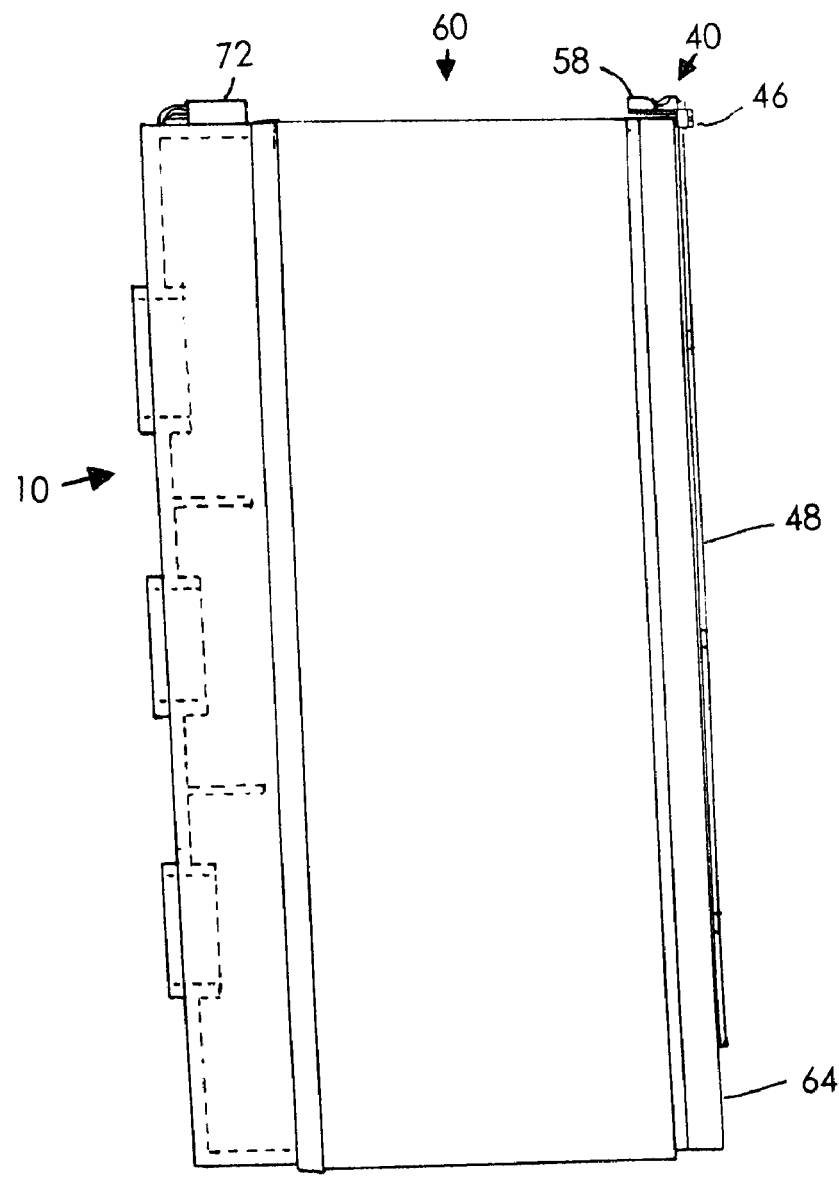
FIG. 6 shows the rack mount assembly of FIG. 5 with the measurement tool rear duct assembly and front assembly attached thereto and including the front assembly wireless transmitter and rear duct wireless receiver/processor assembly.

FIG. 7 shows the wireless receiver and calculation unit 72 which is mounted on the rear duct assembly 10. Calculation unit 72 receives entry air temperature and relative humidity values wirelessly from the sensor and transmitter 58. All sensors could be directly wired to the calculation unit 72, but use of a wireless connection from the front sensors makes the installation of the equipment more flexible and adaptable to rack assemblies of varying size and inlet air opening configuration. Sensed values of rear exit air temperature and relative humidity are received from wires connecting sensors in the ducts which extend to the calculation unit through the conduit 34 which is attached at the opening 74. The tubes 38 from the respective pitot assemblies in the duct portions 18, 19 and 20 are connected to calculation unit 72 through the individual openings 76. The receiver and calculation unit 72 includes a display screen 78 which displays the sensed measurements and calculated results derived therefrom. The screen 78 also includes "touch screen" controls for turning the equipment on and off and making necessary adjustments such as the duration of the time out period cycles of calculation and the refresh of the displayed results.

Figure 8:
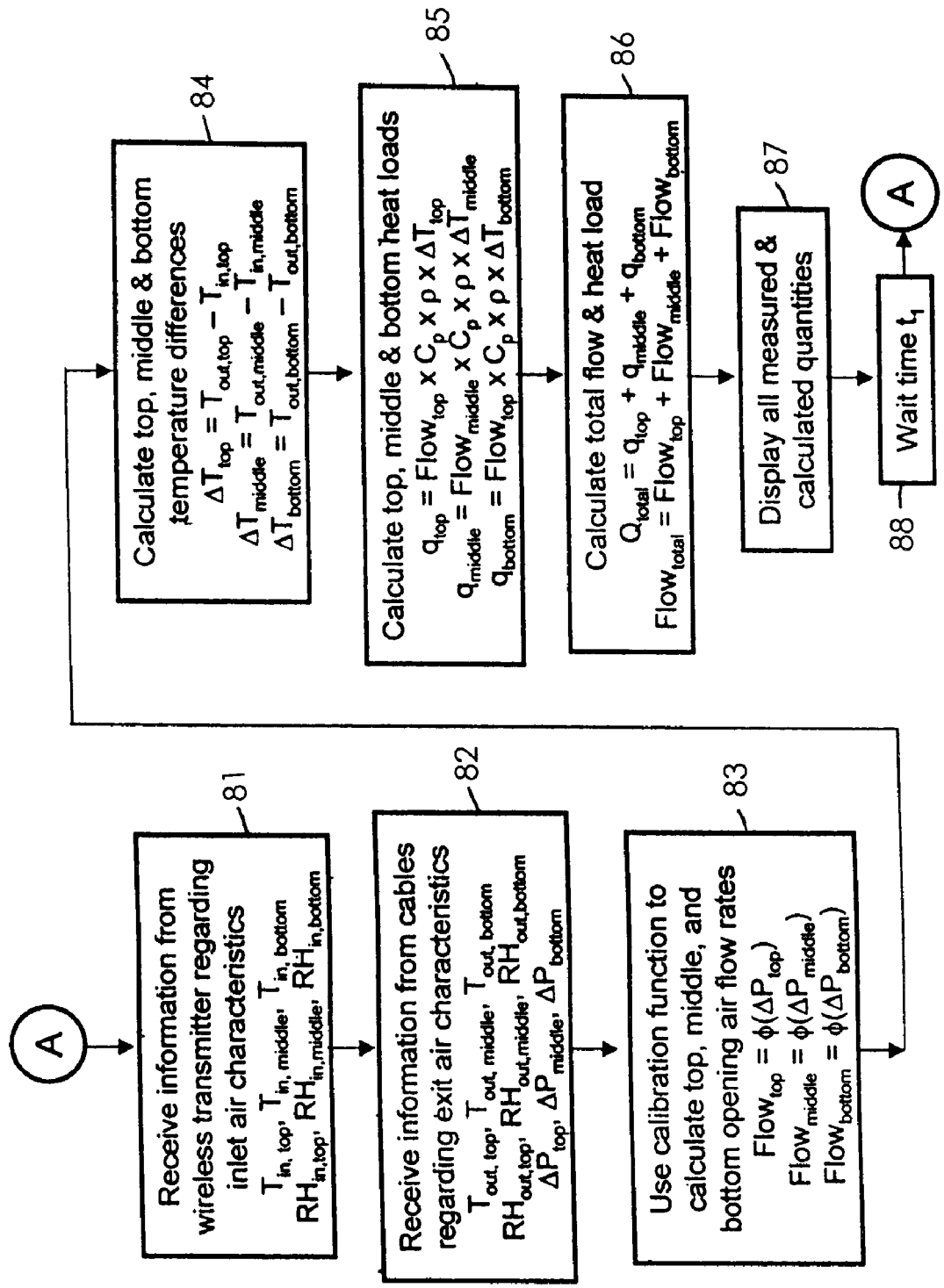
FIG. 8 is a flow chart that shows the processor sequence that generates and displays values such as air flows and heat loads.

FIG. 8 is a flow chart showing the sequence of operations within the calculation unit 72 which generate and display measurements and results based on values sensed within the rack enclosure front input air flow and the rear exhaust air flow. At box 81 inlet air characteristics are sensed including temperature and relative humidity at each of the top, middle and bottom locations and wirelessly transmitted from the transmitter 58 mounted on the front assembly 40 to the receiver and calculation unit 72 mounted on the rear duct assembly 10. At box 82 inlet air characteristics, including relative humidity, temperature and pressure sensed at each of the top, middle and bottom duct portions 18, 19 and 20 are received at the receiver and calculation unit 72. At box 83 the air flow rates at the top, middle and bottom are calculated using the sensed $\Delta P$ multiplied by $\phi$, which is the factor representing the air flow which occurs per unit of the pressure difference sensed. The temperature differences between inlet and outlet air flows are determined at box 84. At box 75, the heat loads within the top, middle and bottom air flows are established using the air flow, specific heat ($C_p$), density ($\rho$) and temperature difference. Finally, the total heat loads and air flows are determined (box 86) and all measured and calculated values are displayed (box 87). Before recycling the calculation cycle and refreshing the display of the measured and calculated values, a time out or wait time is interposed (box 88).

Figure 9:
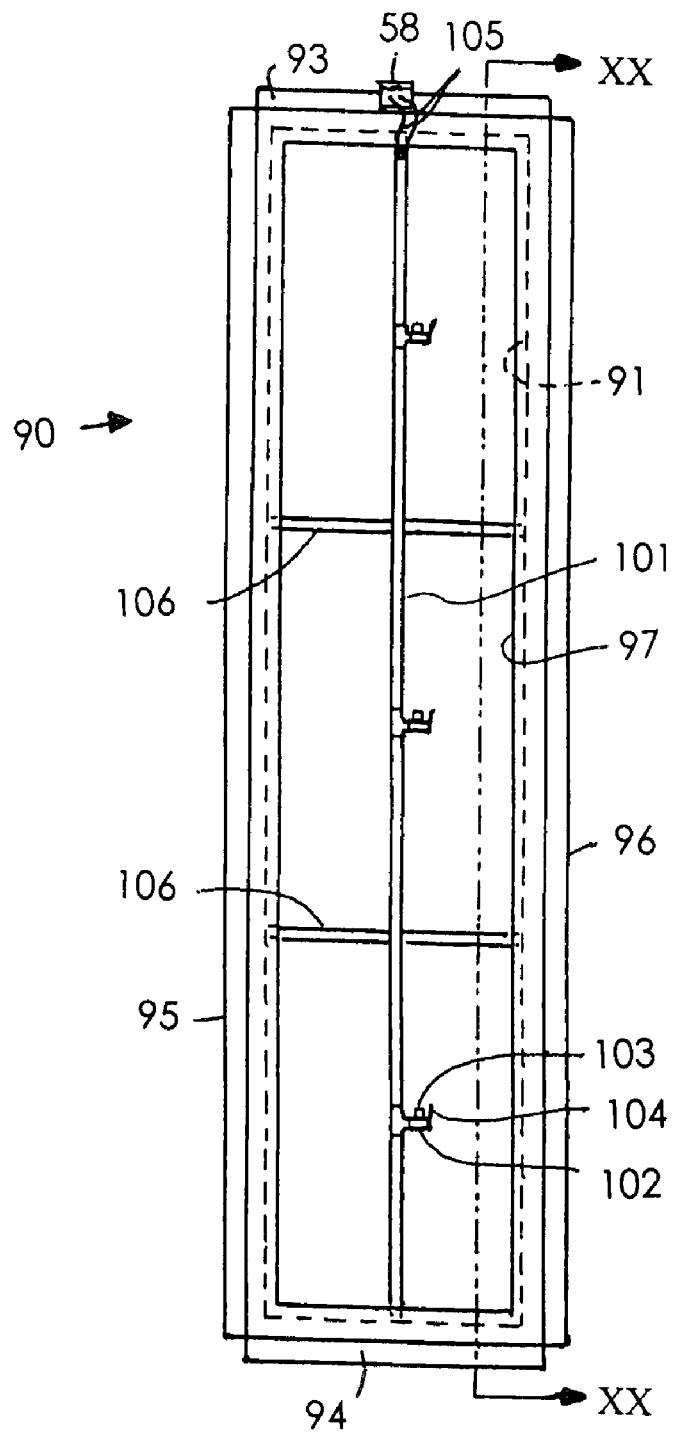
FIG. 9 illustrates an alternative embodiment wherein a front frame is shown which is utilized in conjunction with rear frame of FIGS. 1 and 2.
Figure 10:
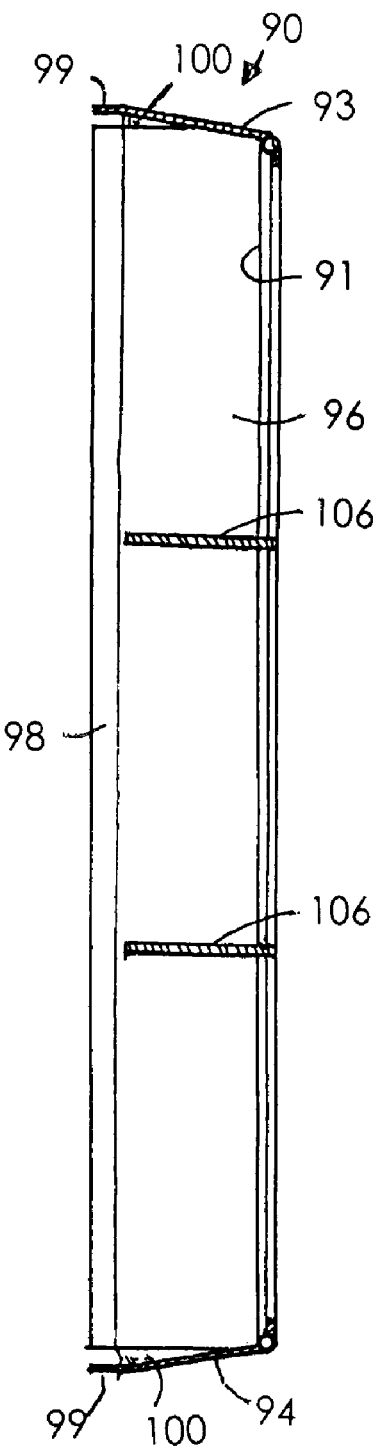
FIG. 10 is a section view taken along line XX of FIG. 9.

FIGS. 9 and 10 illustrate an alternative structure for sensing the air temperature and relative humidity of the entry air at the front of the rack mount enclosure. FIG. 9 is a front elevation of the front frame 90 and FIG. 10 is a section view taken along line XX on FIG. 9. A rectangular tubular frame 91 supports the front wall 92, top wall 93, bottom wall 94, and side walls 95, 96. Front wall 92 surrounds an opening, defined by edge surfaces 97, and provides an enlarged open area calculated to cause minimal resistance to air flow to the front openings of the a rack mount enclosure to which the front frame 90 is attached. Side walls 95 and 96 are secured about the vertical elements of frame 91 respectively and are spring biased toward one another such that the terminal edge flap portions 98 are clamped against the side wall surfaces of a rack mount enclosure to which the front frame 90 is to be attached. Similarly, the top wall 93 and bottom wall 94 are pivotally secured to the horizontal portions of tubular frame 91 and are spring biased toward one another to enable the edge flap portions 98 to be clamped against the upper and lower wall surfaces of a rack mount enclosure to which the frame is to be secured. A flexible web portion 100 is connected between the walls and the edge of the adjoining top or bottom wall to close the openings between adjoining wall portions while allowing the limited pivotal motion of the respective wall with respect to the tubular frame 91. A tubular conduit member 101 is secured to the tubular frame 91 between the top and bottom horizontal portions. Tubular conduit 101 includes branches 102 which support relative humidity sensors 103 and thermocouples 104 for sensing temperature. The tubular conduit 101 supplies a conduit for the cables 105 which lead from the sensors to the wireless transmitter unit 58 (mounted on the top wall). Flow partitioners 106 are supported on tubular frame 91 and positioned between adjacent locations at which temperature and relative humidity are sensed. The flow partitioners 106 are also positioned to be substantially aligned with the flow partitioners 22, 23 carried by the rear duct assembly 10 (FIGS. 1 and 2) when both front and rear assemblies are mounted on a rack mount enclosure.

The use of the front frame of FIGS. 9 and 10 with the rear duct assembly 10 of FIGS. 1 and 2 enables both the inlet air flow and the outlet air flow to be stratified vertically to enhance vertical isolation of air flows and implement better analysis of variations of heat loads within the rack mount enclosure.

The foregoing description of embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. In combination with a rack mount cabinet in which coolant air is aspirated, by devices mounted therein, inwardly through a front opening and exhausted through a rear opening, a device for monitoring physical conditions within such cabinet comprising:
    first means for sensing the temperature of air entering said cabinet at a plurality of vertical locations along the height of said cabinet front opening;
    a frame member surrounding and confining air exhausted from said cabinet rear outlet opening and directing air from said outlet opening through a plurality of vertically spaced ducts;
    second means in each of said vertically spaced ducts for sensing air temperature and outlet air pressure; and
    third processor means, connected to said first and second means, for receiving sensed values and determining and displaying values of cooling air volume and the rate of heat dissipation from said cabinet.

2. The device for monitoring physical conditions within a rack mount cabinet of claim 1 further comprising:
    fourth sensing means for sensing the relative humidity of air entering said cabinet at said plurality of vertical locations along the height of said cabinet front opening;
    fifth sensing means for sensing the relative humidity in each of said vertically spaced ducts; and
    sixth means for connecting said fourth sensing means and said fifth sensing means to said third processor means.

3. The device for monitoring physical conditions within a rack mount cabinet of claim 2 wherein each of said fourth sensing means is respectively adjacent the respective one of said first sensing means; and each of said fifth sensing means is respectively adjacent the related one of said second sensing means.

4. The device for monitoring physical conditions within a rack mount cabinet of claim 3 further comprising:
at least one horizontally extending flow partitioning wall portion carried by said frame member and positioned intermediate adjacent vertically spaced ducts.

5. The device for monitoring physical conditions within a rack mount cabinet of claim 4 further comprising magnetic means for securing said frame member to the rear of said rack mount cabinet.

6. The device for monitoring physical conditions within a rack mount cabinet of claim 5 wherein said magnetic means comprises a continuous, flexible magnet.

7. The device for monitoring physical conditions within a rack mount cabinet of claim 6 further comprising wireless means connecting said first means to said processor means for transmitting data therebetween.

8. A heat flow measuring device for determining physical conditions within a rack mount equipment enclosure having a front inlet opening and a rear outlet opening comprising:
first means for sensing the temperature of air entering said enclosure, through said front opening, at a plurality of vertically spaced locations;
a frame member which confines air exhausted through said enclosure rear outlet opening and directs air from said enclosure rear outlet opening through said frame member to an upper opening, a lower opening and at least one intermediate opening vertically spaced from each of said upper and lower openings;
second means in each of said upper, lower and intermediate openings for sensing outlet air temperature and outlet air pressure; and
processor means connected to said first means and said second means for receiving sensed values and determining and displaying results including cooling air volume and the rate of heat dissipation from said enclosure.

9. The heat flow measurement device of claim 8 wherein said frame member further includes a horizontally extending air flow partitioning wall portion intermediate each of the adjoining frame member upper, lower and intermediate openings.

10. The heat flow measurement device of claim 9 wherein said first means also includes sensing of relative humidity at a plurality of vertically spaced locations and said second means also includes sensing of relative humidity at each of said upper, lower and intermediate openings.

11. The heat flow measuring device of claim 10 further comprising magnetic means carried by said frame member for releasably securing and sealing said frame member to said equipment enclosure about said rear opening.

12. The heat flow measuring device of claim 11 wherein said magnetic means comprises a substantially continuous flexible magnet.

13. The heat flow measuring device of claim 12 wherein said processor means is supported on said frame member and said first means is wirelessly connected to said processor means.

14. The heat flow measuring device of claim 9 wherein said first means further comprises a front frame member which includes a vertically extending opening that confines air entering said rack mount enclosure and a horizontally extending air flow partitioning wall portion intermediate vertically adjacent said means for sensing the temperature of air entering said rack mount enclosure.

15. The heat flow measuring device of claim 14 wherein said front frame member air flow partitioning wall portions are substantially aligned with said air flow partitioning wall portions carried by said frame member which confines air exhausted from said enclosure rear outlet opening.

16. The method of measuring heat flow through a rack mount equipment enclosure with a front inlet opening and a rear outlet opening comprising:
sensing air inlet temperature at a plurality of vertically spaced locations;
confining and directing air from said enclosure outlet opening through upper, lower and at least one intermediate opening respectively vertically spaced from one another;
sensing air outlet temperature and pressure at each of said upper, lower and intermediate openings; and
processor means connected for receiving said sensed temperatures and pressures and calculating heat flow through said equipment enclosure.

17. The method of measuring heat flow through a rack mount equipment enclosure of claim 16 further comprising the step of displaying sensed and calculated values.

18. The method of measuring heat flow through a rack mount equipment enclosure of claim 17 further comprising the step of sensing relative humidity values at a plurality of vertically spaced locations at said enclosure inlet air opening and at each of said upper, lower and intermediate openings which are also received by said processor means.

* * * * *